June 21, 1966   J. W. RYON ET AL   3,257,286
BALL-TYPE CONTROL FOR A NUCLEAR REACTOR
Filed Feb. 28, 1961   3 Sheets-Sheet 1

INVENTORS
Donald C. Schluderberg
John W. Ryon
BY

ATTORNEY

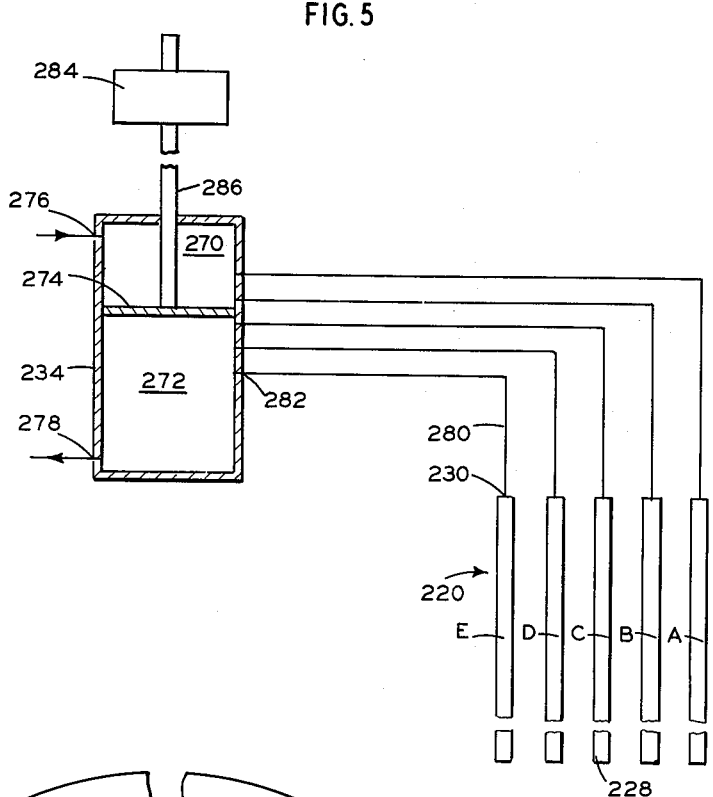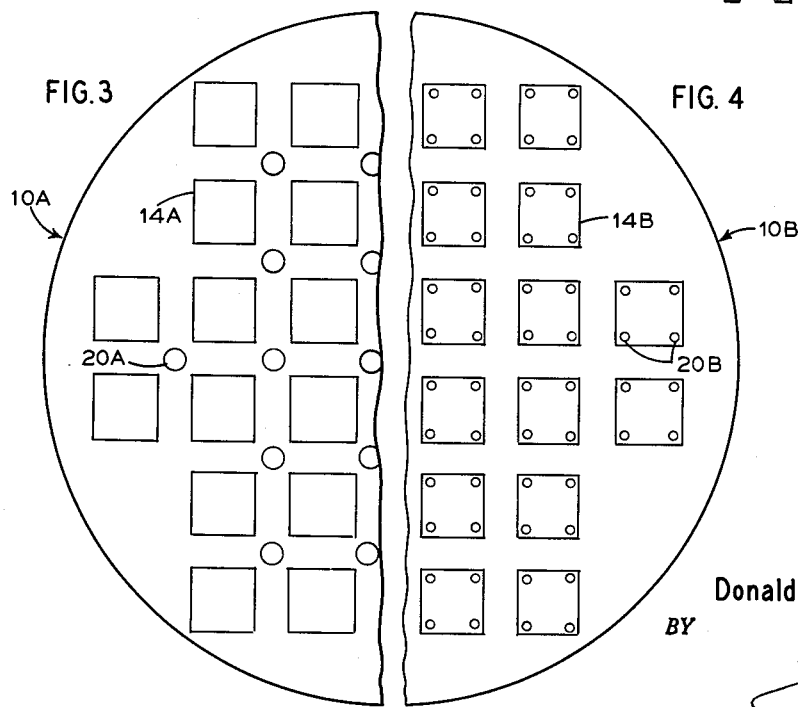

United States Patent Office 3,257,286
Patented June 21, 1966

3,257,286
BALL-TYPE CONTROL FOR A NUCLEAR REACTOR
John W. Ryon and Donald C. Schluderberg, Lynchburg, Va., assignors to The Babcock & Wilcox Company, New York, N.Y., a corporation of New Jersey
Filed Feb. 28, 1961, Ser. No. 92,281
4 Claims. (Cl. 176—35)

This invention is directed to nuclear reactors and more particularly to an arrangement for controlling nuclear reactors.

Control of reactivity in a nuclear reactor may be achieved in a number of ways. Some of the basic control arrangements presently used in reactors are (1) configuration control, obtained by changing the geometry of the reactor, (2) moderator control which is achieved by adjustment of the position or quantity of moderator in the reactor, and (3) absorber control obtained by varying the amount of neutron absorbers within the reactor. In most present-day reactors control of reactivity is achieved by the use of neutron absorbers in some form, and the most common form employed is that of neutron absorber control rods. Generally these control rods are either single flat plate or cruciform shape and are of a sufficient length to extend through the core. By connecting drive mechanisms to the control rods they can be selectively moved in and out of the core to control reactivity. Such control rods are used both in the starting up and shutting down procedure for the reactor and in controlling the reactivity of the reactor during its operation.

While at the present time the control rod with its associated drive mechanism is the most widely used arrangement for reactivity control, it still has certain disadvantages. Among these disadvantages are: control rods must be built to very close tolerances to prevent rod hang up within the core, and further, due to the manner in which the control rod must be withdrawn from and inserted into the core, uneven longitudinal core burn up and serious local power peaks which reduce core power capability result. Additionally, the control rod drive mechanism has inherent disadvantages among which are its high cost and the difficulties encountered in providing penetration for it in the pressure vessel and in providing for access to the core once the drive mechanism is in place.

In the reactor control art it has been known to use balls of neutron absorbing material as a means for emergency scram shutdown of a reactor. These balls are held in a container above the core and are caused to drop into a tube located within the core to achieve shutdown of the fission reaction. Such arangements have been used in conjunction with the regular reactor control system to provide for rapid shutdown or scram of the reactor. While the balls have been used for reactor shutdown they have not been used to regulate the fission reaction during normal reactor operation.

The present invention provides an arrangement using balls of neutron absorbing material for controlling and regulating a nuclear reactor not only at start up and shutdown but during operation of the reactor as well. This arrangement embodies the use of absorber control without the disadvantages normally encountered in the use of control rods and their associated drive mechanisms.

In the core of a nuclear reactor a number of elongated conduits are positioned so that a first section of the conduit is located within and passing through the code while an adjoining second section is located exteriorly of the core and above the first section. Each conduit holds a number of individual bodies each of which contains a high neutron absorption cross-section material, that is, a material which absorbs neutrons without reproducing them. There are sufficient of these bodies placed in each of the conduits to at least partially fill the first sections thereof and provide enough neutron absorber within the core to maintain it subcritical when all of the bodies are located in the first sections of the conduits. The bodies have a transverse uniform cross section which is substantially the same as, but smaller than, the transverse cross section of the passageways in the conduits, this difference in size permits the bodies to be freely movable through the conduit. The movement of the neutron absorber bodies within the conduits is achieved by providing a source of pressurized fluid available to each end of the conduits. Regulable fluid flow means are provided in communication with the conduits to control the pressure and the direction of flow of the pressurized fluid therethrough. By selectively positioning the neutron absorber bodies within the first and second sections of the conduit, the fission reaction can be strated up, shutdown or reactivity controlled during reactor operation.

Reference is made to the "International Conference on the Peaceful Uses of Atomic Energy," vol. 3, U.N. Publication, New York, August 1955, as a source of various reactor types in which the reactor control arrangement as disclosed herein could be used. Further, for a definition of the various nuclear energy terms used herein reference is made to "A Glossary of Terms in Nuclear Science and Technology," ASME 110, 1957, published by the American Society of Mechanical Engineers.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which are illustrated and described the preferred embodiments of the invention.

Of the drawings:

FIG. 3 is a schematic plan section showing a portion of a reactor core embodying the control arrangement of the present invention;

FIG. 4 is a schematic plan section showing a portion of another embodiment of a reactor core embodying the control arrangement of the present invention; and FIG. 5 is a schematic showing of a valve arrangement for use in the present invention.

Figure 1:
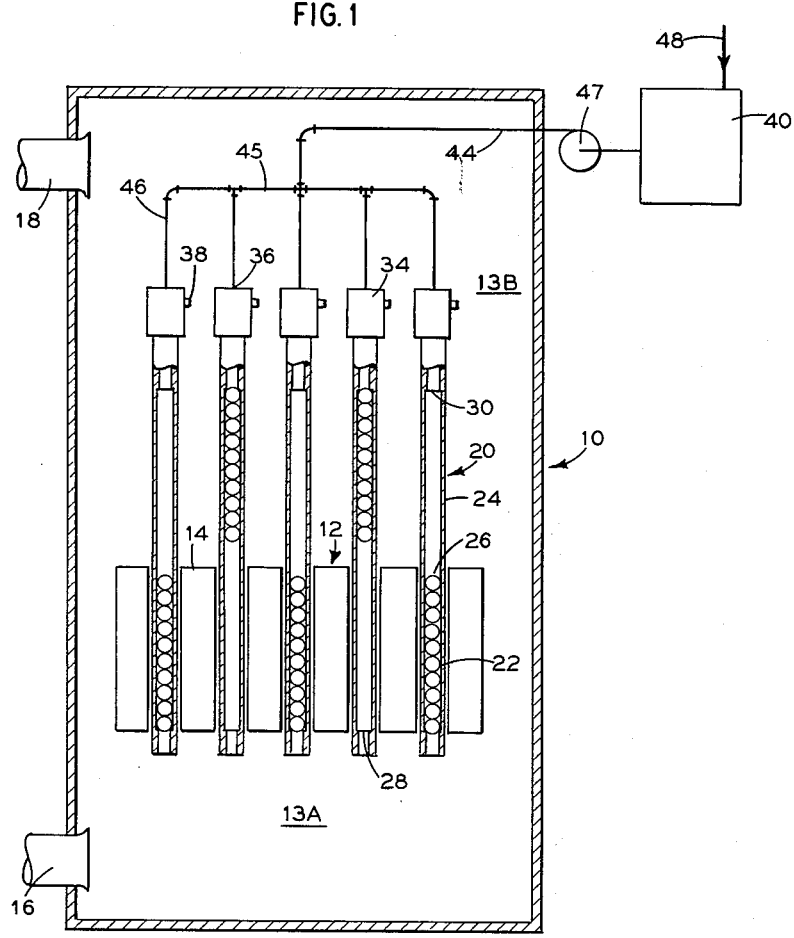
FIG. 1 is a schematic showing of one embodiment of the control arrangement in the present invention.
Figure 1A:
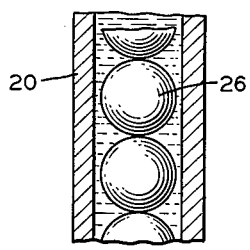
FIG. 1A is an enlarged partial view of one of the conduits shown in FIG. 1.

In FIG. 1 there is shown a nuclear reactor 10 having a core 12 containing a sufficient quantity of fissionable material to establish and sustain a chain-type fission reaction. Within the reactor the core 12 is positioned between a lower plenum 13A and an upper plenum 13B. The fuel or fissionable material within the core 12 is contained in a number of discrete bodies or fuel element assemblies 14. Pressurized coolant fluid enters the reactor through inlet 16 and flows first into the lower plenum 13A and then upwardly through the core 12 removing the heat generated in the fission chain reaction. After leaving the core the coolant passes into the upper plenum 13B and then out through outlet 18 to apparatus (not shown) which converts the heat removed from the core to useful work. A typical reactor of the kind referred to above is illustrated and described in the corresponding application of M. F. Sankovich, Serial Number 712,512, filed January 31, 1958, now abandoned and refiled as Serial No. 145,012 on October 9, 1961.

Within the reactor 10 there are a number of elongated conduits 20 of uniform cross section throughout their length. Each conduit has a first section 22 disposed within the core of the reactor and an adjoining second section 24 situated in the upper plenum 13B above and in axial alignment with the first section. The second section 24 of the conduit 20 is slightly greater in length than is the first section 22.

Each of the conduits 20 contain a plurality of spherical bodies or balls 26 of uniform size disposed substantially in axial alignment within the conduit. The diameter of the balls is slightly smaller than the passageway or inside diameter of the conduit. This difference in size permits the balls to be freely movable between the first and second sections of the conduit. These balls 26 contain a high neutron absorption material in sufficient quantity to maintain the core subcritical when all the balls are situated within the first section 22 of the conduits. The balls 26 may be either solid or hollow, with the neutron absorption material formed in or on the body of the ball itself or contained as a separate substance, i.e., a gas or powder, within the ball. A typical ball used in this invention is one made up of 1½% boron in stainless steel, with a chrome plating on the convex surface of the ball. There is sufficient quantity of the balls 26 within each of the conduits to substantially fill the first sections 22. As illustrated in FIG. 1 the second sections 24 are slightly longer than the first sections 22 so that they can receive all the balls therefrom and assure that none remain in the core region of the reactor. There is also the possibility of having the second sections of the same length or even shorter than the first sections and still provide adequate control.

Fluid to transport the balls through the conduits can be admitted through either a first fluid connection 28 in the lower part or a second fluid connection 30 in the upper part of each of the conduits 20. Both the first and second fluid connections are shaped so the balls 26 will be retained within the first and second sections of the conduit without shutting off flow through these connections. The first fluid connections 28 are arranged to receive or discharge coolant from or to the lower plenum 13A while at the opposite end of the conduits the second fluid connections 30 are each connected to a ported distributing valve 34. This distributing valve 34 which is always open to the conduit 20 through the second fluid connections 30 has an inlet 36 and an outlet 38 which discharges into the upper plenum 13B.

Drum 40, located exteriorly of the reactor 10, contains a supply of the same fluid which is used for the reactor coolant. Line or conduit 44 is connected at one end to the drum 40 and at its opposite end to a distribution header 45. A number of branch lines or conduits 46 connect the header 45 with the inlets 36 to the distributing valves 34. Pump 47 in line 44 supplies the fluid from the drum 40 to the distributing valves 34 at a pressure higher than that of the coolant fluid which is supplied to the reactor through the inlet 16. The drum 40 also has an inlet line 48 through which fluid is supplied to the drum from either the coolant fluid outlet 18 or from a storage supply (not shown). If needed, a pressure regulating valve may be placed in line 44 downstream from the pump 47 to provide a substantially constant coolant pressure at the inlet 36 to the valve 34.

In order both to operate and to control the reactor, the pressurized coolant fluid which also acts as the modulator, must be circulated through the core. During normal operation of the reactor shown schematically in FIG. 1 the coolant is force upwardly through the core 12, passing over and through the fuel elements 14 and removing the heat generated therein by the fission chain reaction. In addition, a portion of the coolant entering the core can be passed upwardly through the conduits 20. A substantial pressure drop occurs as the coolant flows from the lower plenum 13A, through and over the fuel elements in the core, and into the upper plenum 13B. As a result a differential exists between the pressures acting in the first and second fluid connections 28 and 30, respectively, when the second fluid connections are open through the outlets 38 to the upper plenum 13B. The existence of the pressure differential across the conduits 20 enables the coolant fluid to move the balls upwardly from the first section 22 to the second section 24 of the conduits 20.

Prior to start up all of the balls are situated in the first sections 22 of the conduits 20. Usually, before the core can go critical at least one of the first sections must be emptied of the balls to establish and sustain a chain-type fission reaction. If during reactor operation increased output from the core is required, additional first sections will be emptied, and conversely, for reduced output, some of the first sections which have been emptied will have the balls reinserted. If the fission chain reaction is to be stopped either in the course of normal operating conditions or because of an emergency shutdown or scram, the balls in the second sections of the conduits must be reinserted into the first sections to render the core subcritical. Additionally, during reactor operation coolant fluid is passed continuously over the balls regardless of their position within the conduits to remove any heat they absorb from the fission chain reaction.

At the beginning of start-up operations the distributing valves 34 are set so that outlet 38 is closed and inlets 36 are open admitting the coolant fluid from the drum 40 to the conduits 20. The coolant fluid from the drum, since it is at a higher pressure than the fluid in the lower plenum, flows downwardly through the conduits 20 and mixes in the lower plenum 13A with the coolant fluid which enters the reactor through inlet 16. This mixture of coolant fluid flows upwardly through the core 12 passing over and through the fuel elements 14 and then into the upper plenum 13B and from there leaves the reactor through outlet 18.

To initiate the fission chain reaction the balls 26 within at least one of the conduits 20 are moved out of the first section 22 or core region of the reactor into the second section 24. This is done by closing the inlet 36 and opening the outlet 38 of the distributing valve 34. With the flow of the higher pressure coolant fluid to the conduit cut off, the coolant fluid entering the core from the lower plenum 13A will flow upwardly through the conduit, since the conduit is open through outlet 38 to the upper plenum 13B. The pressure drop across the conduit allows the coolant fluid flowing upwardly therethrough to move the balls out of the first section 22 in core 12 and into the second section 24 of the conduit 20. By maintaining the upward flow of the coolant fluid through the conduit the balls are retained and supported within the second section and are cooled as the fluid flows over them and out through outlet 38 into the upper plenum 13B.

If during reactor operation it is necessary to provide more reactivity, the neutron absorber balls are moved from the first to the second sections of additional conduits. This is performed in the same manner as previously described, i.e., by changing the setting of the distributing valves to admit a continuous upward flow of the coolant fluid through those conduits in which the balls are to be moved into the second sections.

When it is necessary to reduce the amount of reactivity within the reactor core or to shutdown the fission reaction entirely the operation is the reverse of that just described. In those conduits 20 which have neutron absorber balls in the second section 24 the associated distributing valves 34 are reset to open inlets 36 and close outlets 38 so the balls will be returned to the first section 22. Since the pressure of the coolant fluid entering through inlet 36 is higher than that of the normal coolant fluid delivered through inlet 16, the flow will be downwardly through the conduit forcing the balls into the first section. The downwardly moving coolant fluid will continue to flow over the balls in the first sections and out through the first fluid connections 28 mixing in the lower plenum 13A with the coolant fluid entering through inlet 16.

By the selective setting of the distributing valves the position of the balls within the individual conduits can be chosen for whatever reactor condition is desired. There is also the further advantage that gravity will assist in dropping the balls into the core region of the reactor, thereby shutting it down if there is a failure in the flow of coolant fluid through the conduits.

Figure 2:
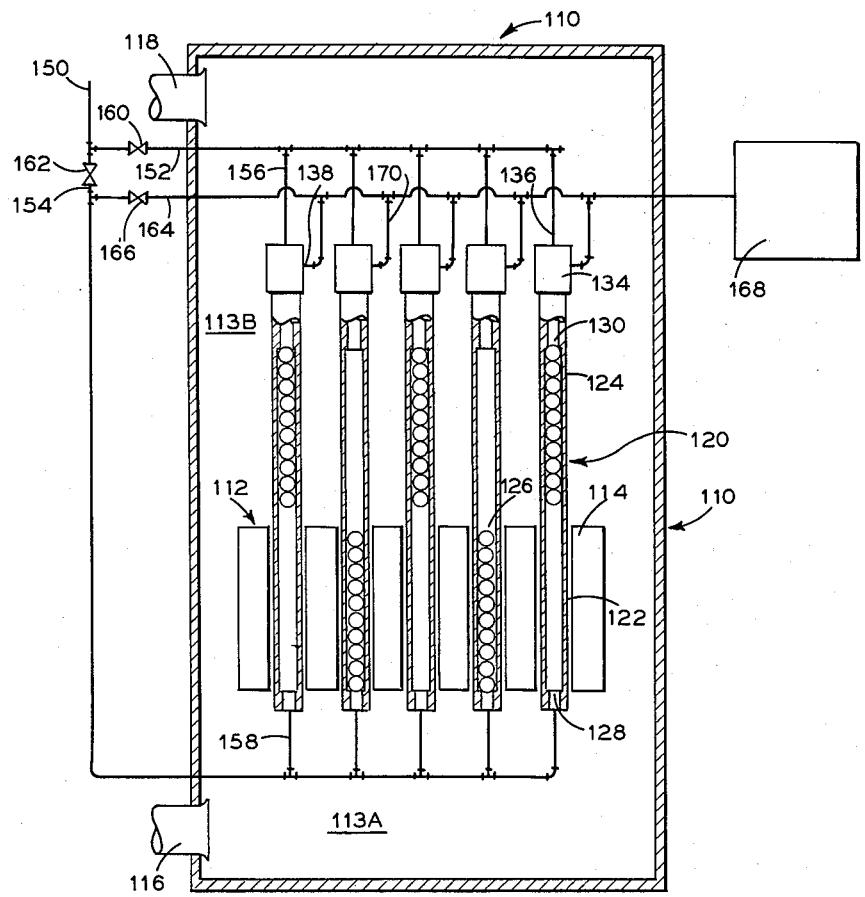
FIG. 2 is a schematic showing of another embodiment of the control arrangement in the present invention.

In FIG. 2 another embodiment of the control arrangement of the present invention is shown in which a separate pressurized fluid, other than the reactor coolant, as for example nitrogen, is used to move the balls through the conduits. Elements in FIG. 2 similar to those shown in FIG. 1 have the prefix 1 added to the FIG. 1 reference numeral. Reactor 110 with its core 112 positioned between inlet plenum 113A and outlet plenum 113B and containing fuel element assemblies 114, as well as reactor coolant inlet 116 and outlet 118 are substantially as described in connection with FIG. 1. This is also true of the conduits 120 with first and second sections 122, 124 and spherical bodies or balls 126 which are positioned within the conduits. First fluid connection 128 at the bottom of and second fluid connection 130 at the top of the conduit 120 are also the same as described in FIG. 1.

Line 150 supplies a pressurized fluid to lines 152, 154. Line 152 is subdivided into a number of branch lines 156 each of which is connected to an inlet 136 in a distributing valve 134 associated with one of the conduits 120. The line 154 is also subdivided into a number of branch lines 158, each of which is connected to the first fluid connections 128 in the lower part of the conduits 120.

Pressure regulating valves 160 and 162 are located in the lines 152 and 154 respectively. An outlet header 164, containing a relief valve 166, is connected at one end to line 154 and at its other end to a storage drum 168. Discharge tubes 170 open at one end to the outlets 138 of the distributing valves 134 and at the opposite ends into the outlet header 164.

The apparatus shown in FIG. 2 operates in substantially the same manner as that shown in FIG. 1. Pressurized fluid selectively moves the balls 126 either upwardly or downwardly through the conduits 120. It also supports the balls within the second section 124 of the conduits and provides a flow over the balls to remove heat they pick up from the fission chain reaction. In this arrangement, however, a pressurized fluid different from the coolant fluid is supplied through line 150 to the lines 152 and 154. Pressure regulating valves 160, 162 within these lines assure a pressure differential in the pressurized fluid flowing into the lines so that the fluid pressure in line 152 is always higher than that in line 154. As shown in FIG. 2, the higher pressure fluid is available through the inlet 136 of the distributing valve 134 to the top of the conduit. The lower pressure fluid in line 154 flows into the conduit 120 through the first fluid connections 128 in the lower part of the conduits.

During operation the pressurized fluid either flows upwardly or downwardly through the individual conduits. It flows upwardly through the conduits 120 from line 154 and branch lines 158 or downwardly through the conduits 120 from the line 152 and branch lines 156 thence through the valve 134 depending on the desired position of the balls within the conduits. The direction of flow within the conduit is controlled by selectively adjusting the valve 134. During normal operation flow is downwardly through the conduit thereby keeping the balls in the first section. This downward flow empties into the branch line 158 and then into line 154. When the pressurized fluid enters line 154 after its downward flow through conduits 120 it becomes mixed with the pressurized fluid flowing in line 154 from line 150 and there are two possible courses of flow the mixture may then take. Because of its flow through the conduit 120 the pressure of the fluid has been reduced to a value similar to that of the pressure of the fluid which enters line 154 through valve 162. This mixture of pressurized fluid may then either flow upwardly through another of the conduits 120 for moving the balls 126 into the second section 124 or upwardly through line 154 and thence through relief valve 166, into the outlet header 164 and finally into the drum 168.

When it is necessary to move the balls from the first to the second section of a conduit the valve 134 is adjusted connecting the conduit to the discharge tube 170 by way of outlet 138 and cutting off the flow of the pressurized fluid to the conduit through inlet 136. With the downward flow discontinued the pressurized fluid from line 154 flows upwardly into the conduit and then on into the storage drum 168. The pressure within the storage drum is either at atmospheric or at least considerably below that of the fluid in line 154. With the pressure in the drum much less than that of the fluid flowing upwardly through the conduit there is a pressure drop across the conduit enabling the fluid to force the balls within the conduit into the second section thereof. As long as the balls are to remain in the second section this upward flow continues. When the balls must be reinserted into the first section of the conduit the valve 134 is reset to admit flow of the fluid downwardly through the conduit and to close the outlet 138. This downward flow forces the balls back into the first section to either shutdown the reactor or if not all conduits are so activated, to control the reactor during operation. Under either condition with the balls in the first or second sections there is a flow of the fluid over them to continuously cool the balls, removing any heat they receive from the fission chain reaction. This heat can be removed from the fluid in a heat exchanger, not shown, to produce useful work.

In FIGS. 3 and 4 two embodiments are illustrated for positioning the conduits within the core of the reactor. In the reactor 10A of FIG. 3 the conduits 20A are positioned at intersections of the flow channels about the fuel element assemblies 14A, while in the reactor 10B shown in FIG. 4 a number of conduits 20B are arranged within each of the fuel element assemblies 14B. In the arrangement in FIG. 4 much closer control or regulation of the reactivity within the reactor and in the individual fuel element assemblies can be achieved. While we have illustrated these two conduit arrangements, it will be understood by those skilled in the art that many variations of conduit arrangement can be provided within the scope of the present invention.

In FIG. 5 a multiport distributing valve 234 is illustrated which can be used to replace a plurality of the distributing valves 34 and 134 of FIGS. 1 and 2. The body of the valve 234 is divided into an upper chamber 270 and a lower chamber 272 by a vertically movable partition 274 which forms a fluid tight seal with the wall of the valve. As in the arrangements previously described the balls are moved through the conduit 220 by a pressurized fluid which is supplied to the second fluid connection 230 at a higher pressure than at which it is supplied to the first fluid connection 228.

The higher pressure fluid is delivered to upper chamber 270 through inlet 276. The lower chamber 272, through outlet 278, opens to the interior of the pressure vessel similar in action to the outlet 38 of the valve 34 as shown in FIG. 1. Alternatively the lower chamber may open into a storage drum 168 through valve 134 as shown in FIG. 2. With either arrangement a pressure drop is provided across the conduit 220 so that the balls can be moved upwardly therein when the conduit is open to the lower chamber 272.

Tubes 280 are connected at one end to the conduits 220 and at their opposite ends into openings 282 which communicate with the upper chamber 270 or the lower chamber 272 of the valve 234. Drive means 284 connected to the partition 274 through the shaft 286 positions the partition within the valve. Depending on the position of the partition 274 the tubes 280 will be connected either to the upper or to the lower chamber 270 or 272 respectively, thereby regulating the direction of flow through the conduits 220. It will be apparent to those skilled in the art that various arrangements may be used for connecting the tubes 280 to the valve 234 so that different combinations of tubes can be connected to either the upper or lower chambers of the valve.

When the multiport distributing valve 234 is used in place of the individual distributing valves 34 and 134 of FIGS. 1 and 2 the regulation of fluid flow is controlled as herein described. For purposes of explanation the conduits 220 are given the additional identifying letters A, B, C, D and E. Further, it is assumed that the balls are all located within the second sections of the conduits 220 and with a desired reduction in reactivity the balls in conduits 220A and 220B only are to be returned into the first sections of their respective conduits. The partition 274 is moved so that conduits 220A and 220B are connected to the upper chamber 272 of the valve 234 through the tubes 280, as illustrated in FIG. 5. With the flow of the higher pressure fluid available through the upper chamber 270, the balls in conduits 220A and 220B will be moved into the first sections thereof. Concurrently the flow in the other three conduits 220C, 220D, 220E is upwardly into the lower chamber thereby maintaining the balls in these conduits out of the core region of the reactor. If the reactor had to be shutdown the partition 274 would be moved downwardly within the valve so that all of the conduits 220 were in communication with the upper chamber 270. Conversely if it were necessary to move all of the balls in each of the conduits 220 out of the core region the partition would be moved upwardly so that all of the conduits are in communication with the lower chamber 272.

In both of the embodiments illustrated and described a pressurized fluid is used to transport the balls. Its normal direction of flow is downwardly through the conduits 220 to assure the positive positioning of the balls in the first conduit sections (in the core region) of the reactor. When it is necessary to move and maintain the balls in the second section (out of the core region) flow is directed upwardly through the conduits moving the balls into the second sections. Using this same general arrangement of apparatus normal flow of the pressurized fluid can be directed upwardly through the conduits with the downward flow being used only to return the balls into the core region. By providing means to regulate the pressure drop across the conduits the upward flow will either move the balls into the second sections or merely flow over and cool the balls within the first sections.

In FIGS. 1 and 2 the conduits are shown positioned vertically and in alignment throughout their length. However, it is also possible to use vertically extending, helically wound conduits or to position the first and second sections out of alignment, that is, with the first section in the core region extending vertically and the second section positioned above it disposed either substantially horizontal or at some angle to the horizontal. It would also be possible to arrange the first section horizontally with the second section positioned in axial alignment with it. It would also be possible to position the second section so it would be inclined at an angle with respect to the horizontal first section.

While the invention has been descirbed and illustrated with the balls positioned in either the first or second sections of the conduits it will be realized by those skilled in the art that means can be provided whereby a portion of the balls within an individual conduit can be removed from the first section. Further, the proportionate amount of neutron absorber in successive balls positioned within the conduit may be varied to flatten the axial flux pattern within the core. Additionally, radial power flattening may be achieved during normal operation by the selective insertion or withdrawal of balls from the first sections of the conduits. It would also be possible to use certain of the balls for the generation of special isotopes of commercial value.

Previously, as has been mentioned, it has been known to use balls of neutron absorber material in reactors in conjunction with the regular reactor control system for emergency scram purposes. In the present invention, however, the neutron absorber balls are used for reactivity control during reactor operation as well as for reactor start up and shutdown. This control arrangement is particularly advantageous because it avoids the disadvantages already cited which are common to movable control rods and their associated drive mechanisms.

Another advantage of this invention is that the conduit and balls can be made in regular commercial processes and do not require special processing to meet exacting tolerances. Further, while the neutron absorber material within the conduits has been described as contained in balls, that is of spherical shape, it is possible to place it in bodies having a cylindrical, spherical or some similar shape which is capable of moving freely through a conduit.

While the invention has been described with reference to a heterogeneous reactor, it is equally applicable to homogeneous reactor.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A nuclear reactor comprising a pressure vessel, a core located within said vessel and containing a sufficient quantity of fissionable material to establish and sustain a chain-type fission reaction, a number of elongated conduits disposed in a regular arrangement within said vessel, each of said conduits comprising a first section located within and extending through said core and an adjoining second section located exteriorly of said core and positioned above said first section, a plurality of bodies each containing a high neutron absorption cross section material positioned within each of said conduits and at least partially filling the first sections thereof, each of said bodies having a transverse cross-sectional shape substantially the same as but smaller than that of said conduit so that the bodies are freely movable through said conduits, a first fluid connection to the lower part of each of said conduits and a second fluid connection to the upper part of each of said conduits for the passage of pressurized fluid therethrough continuously in either direction while maintaining the reactor in operation, first means for supplying pressurized fluid to said first fluid connection at a first selected pressure, second means for supplying pressurized fluid to said second fluid connection at a second selected pressure which is higher than said first selected pressure at said first fluid connection for positive insertion of said bodies from said second sections into said first sections means preventing movement of said bodies beyond said first and second sections of said conduits, and regulable fluid flow means in communication with at least said second means for supplying pressurized fluid to said second fluid connection for individually controlling the direction of flow of pressurized fluid through each of said conduits to thereby position said bodies selectively in first and second sections of said conduits to control reactivity during reactor operation as well as to control start up ad shutdown of the fission reaction.

2. A nuclear reactor comprising a pressure vessel, a core located within said vessel and containing a sufficient quantity of fissionable material to establish and sustain a chain-type fission reaction, a number of vertically elongated conduits of uniform circular cross section disposed in a regular arrangement within said vessel, each of said conduits comprising a first section located within and extending vertically through said core and an adjoining second section located exteriorly of said core and positioned above and in axial alignment with said first section, a plurality of separate spherical bodies positioned within each of said conduits, each of said spherical bodies containing a high neutron absorption cross-section material and having a substantially uniform diameter sufficiently smaller than the inside diameter of said conduits so that the bodies are freely movable through the conduits, the total quantity of the neutron absorption material within said bodies being sufficient to maintain the core subcritical when all of said bodies are located within the first sections of said conduits, a first fluid connection to the lower part of each of said conduits, a second fluid connection to the upper part of each of said conduits, both of said first and second fluid connections arranged to prevent movement of said bodies beyond said first and second sections of said conduit, means for supplying pressurized fluid to said first fluid connection at a first selected pressure, means for supplying pressurized fluid to said second fluid connection at a second selected pressure which is higher than said first selected pressure, and regulable valve means in communication with at least one of the fluid openings in each of said conduits for individually controlling the direction of flow of pressurized fluid through the conduit and thereby selectively position said bodies in said conduit to control reactivity during reactor operation as well as to control start up and shutdown of the fission reaction.

3. A nuclear reactor comprising a pressure vessel, a plurality of separate uniform fuel element assemblies disposed within said vessel to form a core, said assemblies containing a sufficient quantity of fissionable material to establish and sustain a chain-type fission reaction, a lower plenum disposed below said core, an upper plenum disposed above said core, an inlet in said vessel communicating with said lower plenum for supplying pressurized coolant fluid thereto, an inlet header disposed in said upper plenum for supplying a separate source of pressurized coolant fluid to said vessel at a pressure higher than the pressure of the coolant fluid within said lower plenum, a number of vertically elongated conduits of uniform circular cross section each having a first section and a second section disposed within said vessel, said first sections of said conduits located within and extending upwardly through said core, the second sections of said conduits located superjacent to said core and in axial alignment with said first sections, a plurality of spherical bodies positioned within each of said conduits in general axial alignment therein and at least partially filling the first sections thereof, each of said spherical bodies containing a high neutron absorption cross-section material and having a substantially uniform diameter sufficiently smaller than the inside diameter of said conduit whereby said bodies are freely movable therethrough, a first fluid connection to the lower part of each of said conduits arranged to receive pressurized coolant fluid from said lower plenum, a second fluid connection to the upper part of each of said conduits, both said first and second fluid connections arranged to prevent movement of said bodies beyond the first and sescond sections of said conduits, a connection between each of said second fluid openings a number of branch pipelines connecting said inlet header to each of said second fluid connections, regulable valve means in communication with each of said second fluid connections for individually and selectively controlling the direction of flow of the coolant fluid passing through said conduits thereby to position said bodies within said conduits to control reactivity during reactor operation as well as to control start up and shutdown of the fission reaction.

4. A nuclear reactor comprising a pressure vessel, a plurality of separate uniform fuel element assemblies disposed within said vessel to form a core, said assemblies containing a sufficient quantity of fissionable material to establish and sustain a chain-type fission reaction, a number of vertically elongated conduits of uniform circular cross section each having a first section and an adjoining second section disposed within said vessel, the first section of said conduits located within and extending through said core, the second section of said conduits located superjacent to said core and in axial alignment with said first sections, a plurality of spherical bodies positioned within each of said conduits in general axial alignment therein and at least partially filling the first sections thereof, each of said spherical bodies containing a high neutron absorption cross-section material and having a substantially uniform diameter sufficiently smaller than the inside diameter of said conduit whereby said bodies are freely movable therethrough, a first fluid connection to the lower part of each of said conduits, a second fluid connection to the upper part of each of said conduits, both of said first and second fluid connections arranged to prevent movement of said bodies beyond the first and seond sections of said conduits, an inlet header supplying a high pressure fluid to said vessel for moving said spherical bodies through said conduits, a first pipeline connected at one end to said inlet header and subdivided at its opposite end into a number of first branch pipelines each communicating with one of said first fluid connections, a second pipeline connected at one end to said inlet header and subdivided at its opposite end into a number of second branch pipelines each communicating with one of said second fluid connections, pressure reducing means disposed in said first and second pipelines providing a lower pressure in the high pressure fluid supplied to said first fluid connection than that supplied to said second fluid connection, and regulable valve means in communication with each of said second fluid connections to individually and selectively control the direction of flow of the high pressure fluid through said conduits to thereby position said bodies within said conduits to control reactivity during reactor operation as well as to control start up and shutdown of the fission reaction.

References Cited by the Examiner

UNITED STATES PATENTS 2,982,713   5/1961   Sankovich et al. ____ 204—193.2

FOREIGN PATENTS 1,211,272   10/1959   France.
1,052,000   3/1959   Germany.
839,940   6/1960   Great Britain.

OTHER REFERENCES

Perry: "Chemical Engineer's Handbook," 3rd edition, published by McGraw-Hill, 1950, p. 408.

LEON D. ROSDOL, *Primary Examiner.*

REUBEN EPSTEIN, CARL D. QUARFORTH,
*Examiners.*

M. R. DINNIN, L. D. RUTLEDGE,
*Assistant Examiners.*